United States Patent [19]
Kang et al.

[11] Patent Number: 5,644,973
[45] Date of Patent: Jul. 8, 1997

[54] DEVICE FOR BREWING THE ROASTED AND GROUND BEANS OF THE COFFEE IN A VENDING MACHINE

[75] Inventors: Tae Ho Kang; Dae-ryong Yun, both of Bok-Gu, Rep. of Korea

[73] Assignee: Kwangju Electronics Co., Ltd., Kwangju, Rep. of Korea

[21] Appl. No.: 664,377

[22] Filed: Jun. 14, 1996

[30] Foreign Application Priority Data

Jun. 22, 1995 [KR] Rep. of Korea .................. 1995-14361
Nov. 18, 1995 [KR] Rep. of Korea .................. 1995-42096

[51] Int. Cl.$^6$ .............................. A47J 31/32; A47J 31/40
[52] U.S. Cl. .......................... 99/289 R; 99/295; 99/323.3
[58] Field of Search ................................. 99/289 R, 289 P, 99/289 D, 279, 323.3, 295, 300, 302 R, 302 C, 275; 426/433

[56] References Cited

U.S. PATENT DOCUMENTS

| | | | |
|---|---|---|---|
| 3,011,426 | 12/1961 | Mueller | 99/323.1 |
| 3,413,907 | 12/1968 | Schwertfeger et al. | 99/289 R |
| 5,265,518 | 11/1993 | Reese | 99/302 R |
| 5,479,848 | 1/1996 | Versini | 99/295 |

FOREIGN PATENT DOCUMENTS 4326196  11/1992  Japan .

*Primary Examiner*—Robert W. Jenkins
*Attorney, Agent, or Firm*—Ladas & Parry

[57] ABSTRACT

Disclosed is a device for brewing the roasted and ground beans of the coffee used in a vending machine, which comprises a ground beans receptacle for containing the roasted and ground beans of the coffee, a mixing means for mixing the ground beans of the coffee with a hot water, an extracting chamber for providing a space used to extract a coffee liquid, an extracting means for extracting the coffee liquid by jetting a pressurized air against the mixture of the roasted and ground beans and hot water, a filter mechanism arranged below the extracting chamber for filtering the coffee liquid, a reciprocating means for lowering and raising extracting chamber, and a sweeper for removing the residue remaining on the filter mechanism, characterized in that the filter mechanism further comprises a porous filter part for passing pure coffee liquid only, a support part for supporting the filter part not to be distorted by an external pressure, and a buffer arranged between the filter part and the support part for absorbing the jetting force of the pressurized air and the tearing force of the sweeper.

9 Claims, 6 Drawing Sheets

DEVICE FOR BREWING THE ROASTED AND GROUND BEANS OF THE COFFEE IN A VENDING MACHINE

TECHNICAL BACKGROUND

The present invention concerns a device for brewing the roasted and ground beans of the coffee mounted in a vending machine, which comprises a ground beans receptacle for containing the roasted and ground beans of the coffee, a mixing means for mixing the ground beans of the coffee with a hot water, an extracting chamber for providing a space used to extract a coffee liquid, an extracting means for extracting the coffee liquid by jetting a pressurized air against the mixture of the roasted and ground beans and hot water, a filter mechanism arranged below the extracting chamber for filtering the coffee liquid, a reciprocating means for lowering and raising the extracting chamber, and a sweeper for removing the residue remaining on the filter mechanism.

Generally, a vending machine is to automatically dispense food and beverages such as coffee, tea, etc. In such machines, the coffee is usually prepared by mixing an instant powdered coffee with a hot water, sugar and cream. A recently developed vending machine has a mechanism to provide a regular coffee prepared by brewing the roasted and ground coffee beans so as not to lose the original good taste and aroma of the coffee.

Such a vending machine for providing a regular coffee comprises, as shown in FIG. 1, a housing 1, an instant powdered coffee receptacle 2, a tea receptacle 3, a water container 4 mounted above the coffee and tea receptacles 2 and 3, a cup housing 5 mounted below the receptacles 2 and 3, a cup dispenser 6 for sequentially dispensing cups, and a regular coffee extractor 10 mounted beside the instant coffee receptacle 2. The regular coffee extractor 10 is a device for brewing the roasted and ground beans of the coffee supplied from a ground coffee beans container 11. In operation, when a coffee selection button, for example, is pushed to obtain a cup of instant coffee, a given amount of the instant coffee powder is mixed with a hot water in a mixing container 7 mounted below coffee receptacle 2 discharged into a cup dispensed from the cup dispenser 6 to the cup housing 5.

Referring to FIG. 2, the device 10 for brewing the roasted and ground beans of the coffee used in a conventional vending machine comprises a ground beans receptacle 11 for containing the roasted and ground beans of the coffee, a hot water container 12 for supplying a hot water, a mixing means 13 for mixing the ground beans of the coffee with a hot water, an extracting chamber 16 for providing a space used to extract a coffee liquid, an extracting means 17 for extracting the coffee liquid by jetting a pressurized air against the mixture of the roasted and ground beans and hot water, a filter mechanism 20 arranged below the extracting chamber for filtering the coffee liquid, a reciprocating means 18 for lowering and raising the extracting chamber 16, and a sweeper 19 for removing the residue remaining on the filter mechanism.

The reciprocating means 18 is to lower the extracting chamber 16 to contact the filter mechanism in a sealed manner so as to prevent a pressurized air from leaking when extracting coffee, and then, to raise again the extracting chamber 16 for the sweeper 19 to remove the residue remaining on the filter mechanism 20. The sweeper 19 has a brush 19a at the lower end for removing the residue by sweeping motion. Additionally, a counter stream checker 15 is provided in the coffee supply conduit 14 for connecting the mixing means 13 with the extracting chamber 16 so as to prevent the pressurized air jetted from the extracting means 17 from coming into the ground beans receptacle 11.

Operating the regular coffee extractor, the reciprocating means 18 lowers the extracting chamber 16 to close contact the top of the filter mechanism 20, and then a given amount of the roasted and ground beans of the coffee is mixed with a hot water in the mixing means 13. The mixture of the ground coffee beans and hot water flows through the coffee supply conduit 14 to the extracting chamber 16. The counter stream checker 15 blocks the coffee supply conduit 14 for the extracting means 17 to jet a pressurized air into the extracting chamber 16 so as to brew out the coffee liquid discharged through the filter mechanism 20 to a cup. Finally, the reciprocating means 18 is raised upward, and then, the brush 19a reciprocates to remove the residue on the filter mechanism by sweeping motion.

In such a conventional regular coffee extractor, the filter mechanism 20 consists of a frame 22 having a lattice 23 and a metal sieve 21 covering the frame 22 as shown in FIG. 7. In this case, since the metal sieve is supported by the crossed strips of the lattice 2 spaced wide, it is easily fractured by the shocks or pressures exerted during extracting the coffee liquid. Namely, when a pressurized air is jetted from the extracting means 17 against the metal sieve 21 close contacting the lattice 23, the metal sieve 21 is pressed down into the spaces between the crossed strips of the lattice 23. Moreover, when the brush 19a sweeps the metal sieve to remove the residue after finishing the extracting step, it also contributes to pressing down the metal sieve 21 into the spaces of the crossed strips of the lattice. Such actions are repeated resulting in the fracture.

Referring to FIG. 8 for illustrating the metal sieve pressed down into the spaces of the crossed strips of the lattice due to the pressure exerted by the brush 19a, even if the brush 19a reciprocates to sweep the metal sieve 21 in this state, the residue can not be completely removed from the bent portions of the metal sieve, so that it is substantially impossible to obtain pure coffee liquid. In order to resolve such drawbacks, the filter mechanism 20 was taken out frequently to clean or replaced with a fresh one. If not making a proper replacement, the coffee liquid consequently was mixed with the residue degrading the quality.

SUMMARY OF THE INVENTION

It is an object of the present invention to provide means for preventing a filter mechanism of a coffee brewing device used in a vending machine from being distorted by a pressure or shock exerted in operation.

It is another object of the present invention to provide a filter mechanism with means for absorbing pressures or shocks exerted during operation of a coffee brewing device in a vending machine.

It is a further object of the present invention to provide a device for brewing the roasted and ground beans of the coffee used in a vending machine which may provide a pure regular coffee.

According to an embodiment of the present invention, a device for brewing the roasted and ground beans of the coffee used in a vending machine comprises a ground beans receptacle for containing the roasted and ground beans of the coffee, a mixing means for mixing the ground beans of the coffee with a hot water, an extracting chamber for providing a space used to extract a coffee liquid, an extracting means for extracting the coffee liquid by jetting a pressurized air against the mixture of the roasted and ground beans and hot water, a filter mechanism arranged below the extracting chamber for filtering the coffee liquid, a reciprocating means for lowering and raising extracting chamber, and a sweeper for removing the residue remaining on the filter mechanism, characterized in that the filter mechanism further comprises a porous filter part for passing pure coffee liquid only, a support part for supporting the filter part not to be distorted by an external pressure, and a buffer arranged between the filter part and the support part for absorbing the jetting force of the pressurized air and the tearing force of the sweeper.

Preferably, the filter mechanism further includes a retainer for retaining the filter part. The retainer is assembled with the support part so as to prevent separation of the filter part from the support part. The retainer and support part are assembled with their flanges thermally fused together. In one aspect of the present invention, the filter part is integrally mounted on the retainer. The filter part may be snugly fitted into the inside of the retainer.

The buffer is made of a resilient material to absorb a shock exerted to the filter part, having a plurality of fine holes with a diameter greater than that of the pores of the filter part to easily discharge the coffee liquid passing filter part. The support part includes a plurality of vertical protuberances respectively inserted into corresponding connection holes formed in the buffer, so that the buffer is fixedly connected to the support part. Each of the protuberances has a length greater than the thickness of the buffer and a lower part thicker than the diameters of the connection holes so as to form a gap between the filter part and the support part, whereby the coffee liquid passing the filter part may be easily discharged.

The present invention will now be described more specifically with reference to the drawings attached only by way of example.

BRIEF DESCRIPTION OF THE ATTACHED DRAWINGS

DETAILED DESCRIPTION OF PREFERRED EMBODIMENTS

Figure 3:
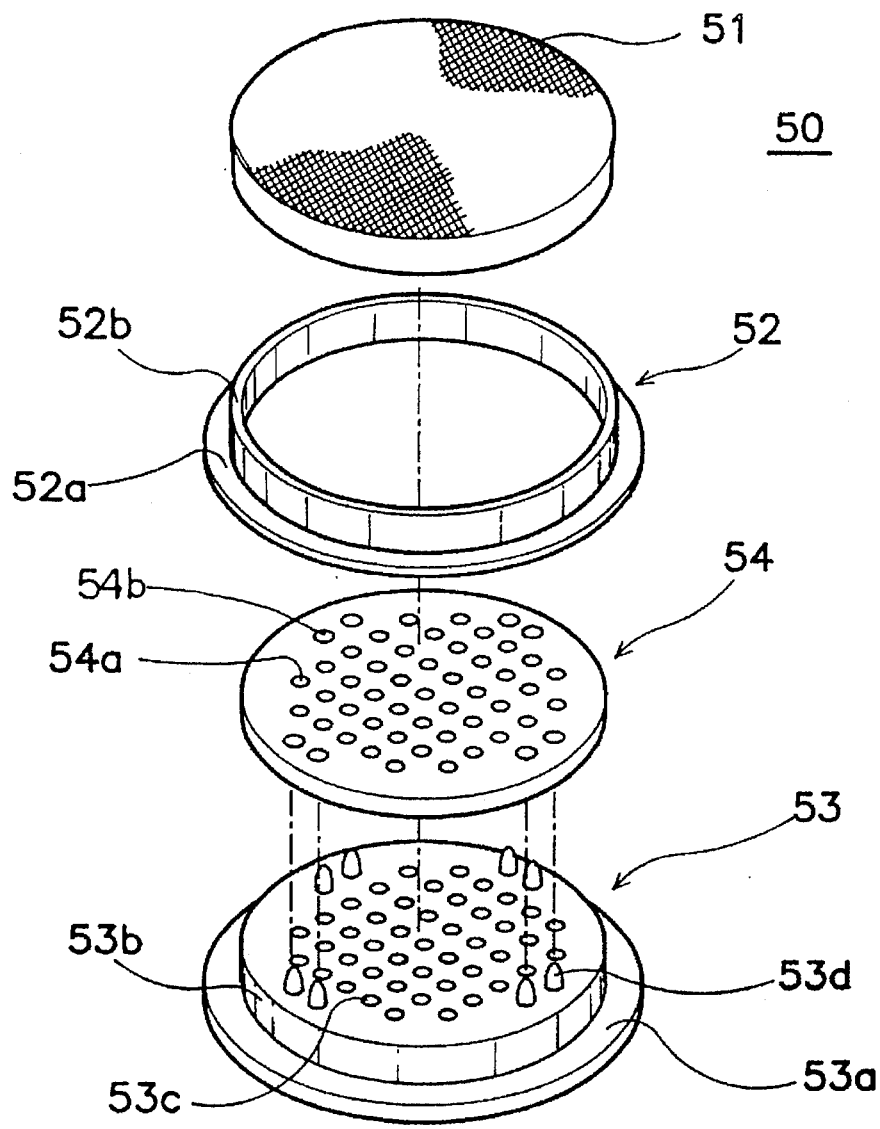
FIG. 3 is an exploded perspective view for illustrating a filter mechanism according to an embodiment of the present invention.
Figure 4:
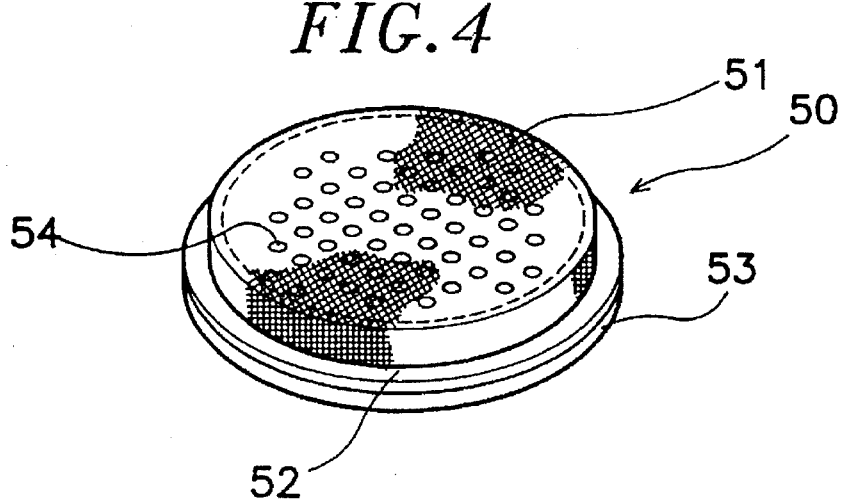
FIG. 4 is a perspective view for illustrating the assembled filter mechanism of FIG. 3.
Figure 5:
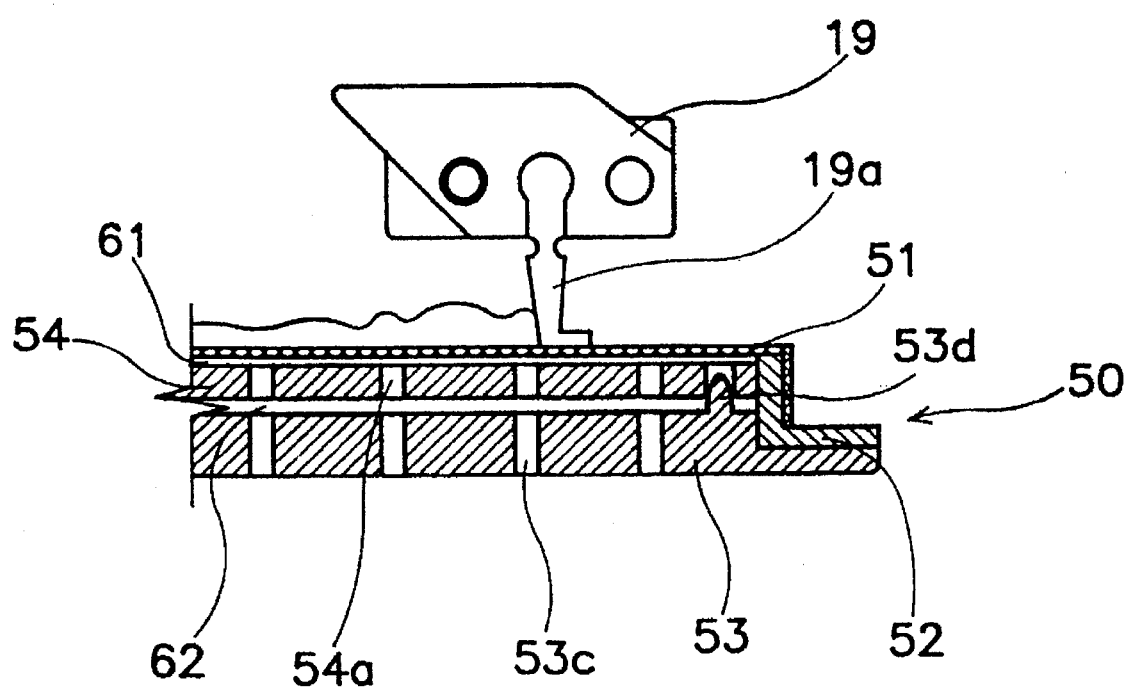
FIG. 5 is a cross section view for illustrating the operation of the filter mechanism of FIG. 3.

Same reference numerals are used to represent corresponding parts throughout the drawings. Referring to FIGS. 3 to 5, a filter mechanism 50 includes a porous filter part 51 for filtering coffee liquid, a retainer 52 for retaining the filter part 51, a support part 53 for supporting the filter part 51, and a buffer 54 for absorbing the shocks exerted to the support part 53.

The retainer 52 consists of a ring-shaped frame 52a and a tube-like part 52b extended from the inner perimeter of the frame 52a. A 600-mesh sieve is attached to the tube-like part 52b by using a connection wire or other means.

The buffer 54 is made of a resilient material such as rubber, having a plurality of fine holes 54a with a diameter greater than that of the pores of the filter part 51.

The support part 53 consists of a frame corresponding to the frame 52a of the retainer 52 and a cylindrical projection 53b having a plurality of holes 53c. Additionally provided around the holes of the projection 53b are a plurality of vertical protuberances 53d respectively inserted into corresponding connection holes 54b formed in the buffer 54, so that the buffer 54 is fixedly connected to the support part 53.

Referring to FIGS. 3 and 4, the filter mechanism 50 is assembled firstly by inserting the vertical protuberances 53d of the support 53 into the corresponding connection holes 54b of the buffer 54. The retainer 52 having filter part 51 is mounted on the top of the support part 53 so that the tube-like part 52b receives the cylindrical projection 53b of the support part 53 for the frame 52a to contact the frame 53a. The frames 52a and 53a are thermally fused together to complete the assembly.

Referring to FIG. 5, the assembled filter mechanism 50 has a small gap 61 between the filter part 51 and the buffer 54 and a small gap 62 between the buffer 54 and the support part 53 so as to easily discharge the coffee liquid passing the filter part 51.

Figure 1:
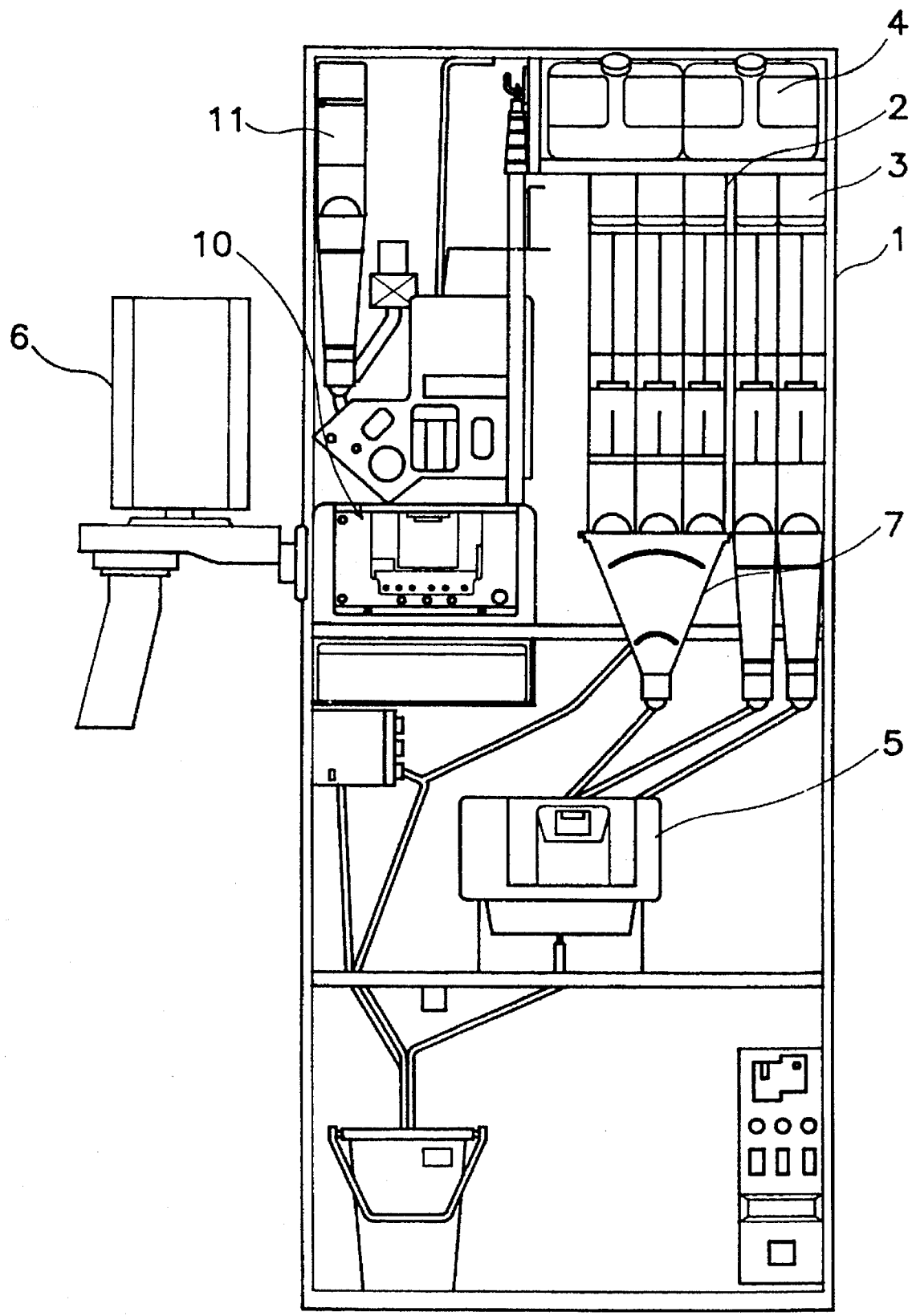
FIG. 1 is a view for illustrating the internal structure of a vending machine provided with a device for brewing the roasted and ground beans of the coffee.
Figure 2:
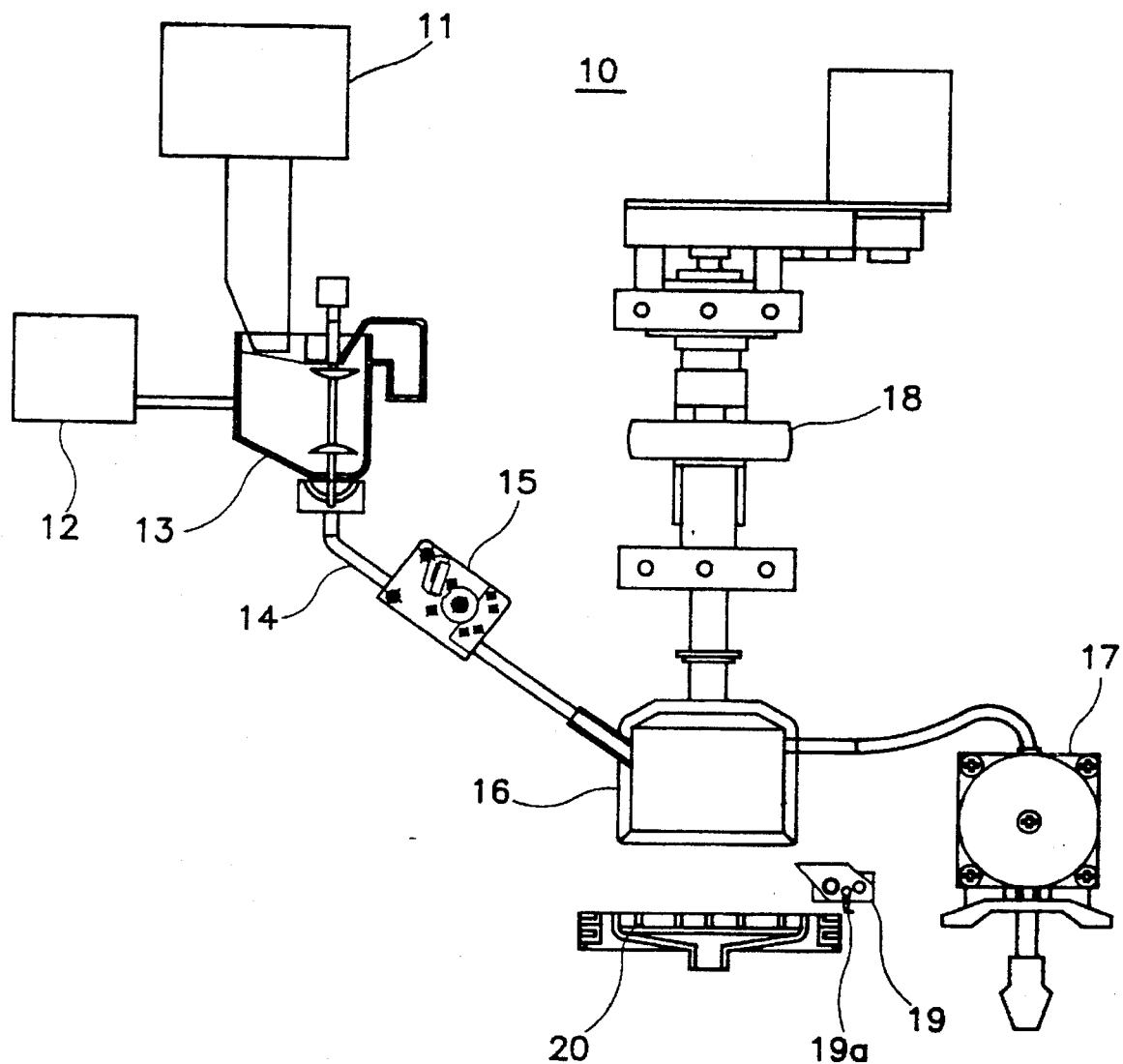
FIG. 2 is a schematic diagram for illustrating the general construction of a device for brewing the roasted and ground beans of the coffee.

In operation, the extracting chamber 16 containing the mixture of the ground coffee beans and hot water is lowered to close contact the filter mechanism 50, and then, a pressurized air is jetted from the extracting means 17 against the mixture to extract the coffee liquid discharged through the porous filter part 51 to a cup contained in the cup housing 5 as shown in FIG. 1. The residue remaining on the filter part 51 is removed and discharged to a refuse receptacle (not shown) by reciprocating the brush 19a of the sweeper 19 after the reciprocating means 18 has raised the extracting chamber 16.

When a pressurized air is jetted from the extracting means 17 against the filter part 51, the filter part 51 is pressed downward supported by the support part 53. The shock caused by the pressurized air is absorbed by the buffer 54.

Likewise, the tearing force exerted by the sweeping motion of the brush 19a is also absorbed by the buffer 54 through the support part 53, as shown in FIG. 5. Thus the filter part 51 is prevented from fracturing.

Figure 6:
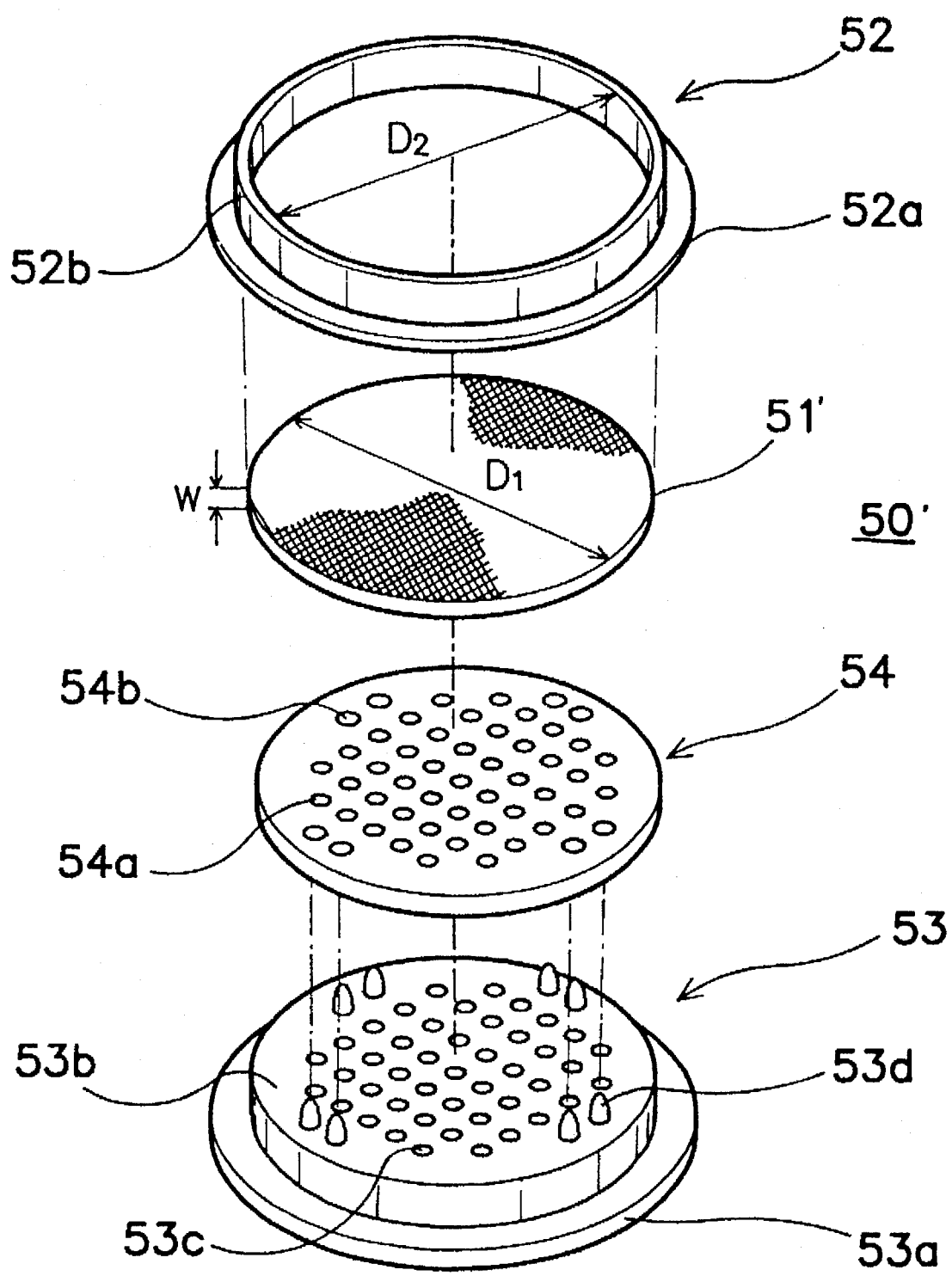
FIG. 6 is an exploded perspective view for illustrating a filter mechanism according to another embodiment of the present invention.
Figure 7:
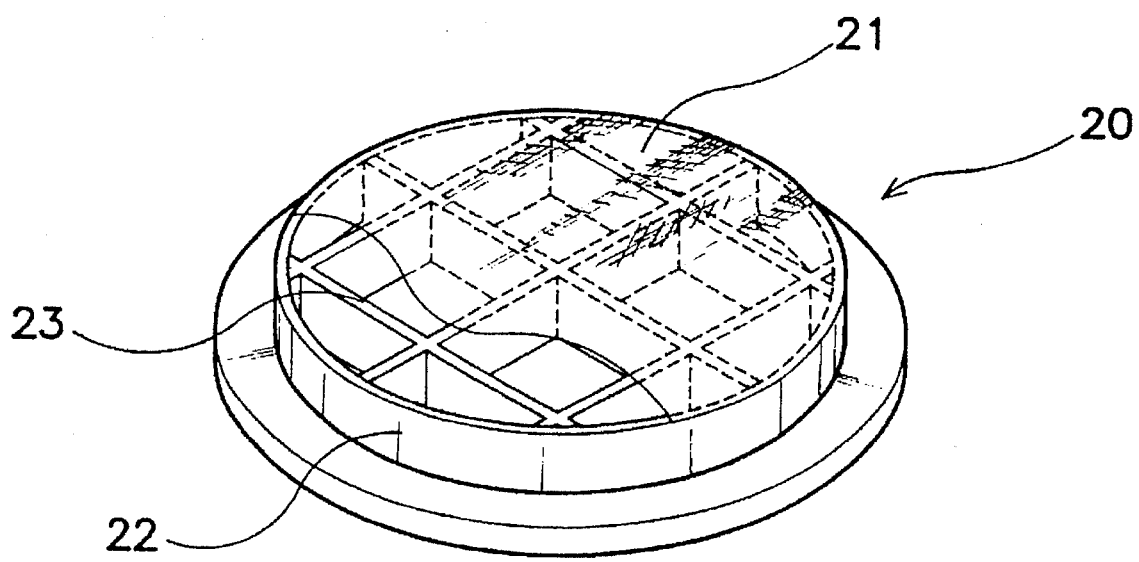
FIG. 7 is a perspective view for illustrating a conventional filter mechanism.
Figure 8:
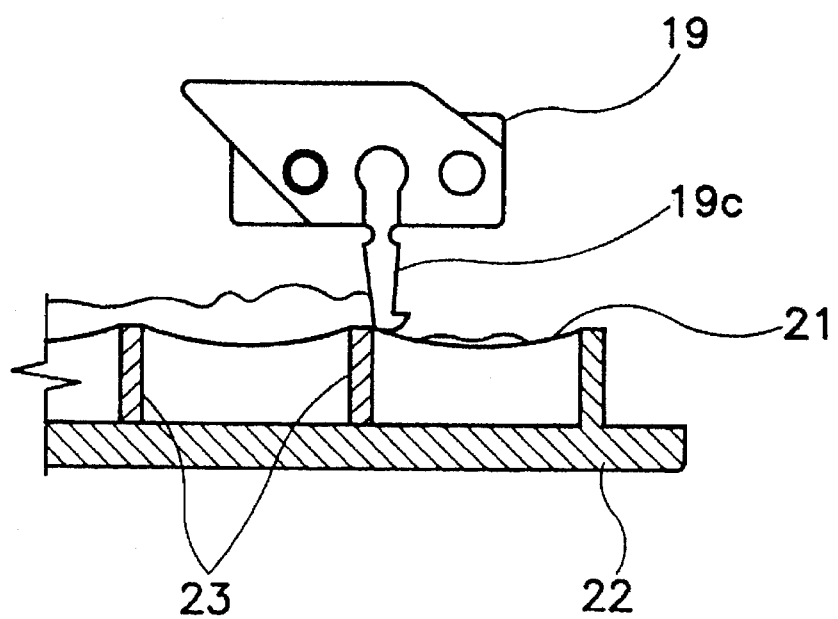
FIG. 8 is a cross sectional view for illustrating the operation of the filter mechanism of FIG. 7.

FIG. 6 shows another embodiment of the inventive filter mechanism 50', whose construction is made in the same way as the first embodiment except the filter part 51'. Namely, the buffer 54 is fixedly attached to the support part 53 with the vertical protuberances 53d received by the connection holes 54b. The retainer 52 containing the filter part 51' is attached to the support part 53 with their frames 52a and 53a thermally fused together. The filter 51' is disk-shaped with a small thickness (W) having a plurality of fine holes as in the case of the first embodiment. The diameter D1 of the filter part 51' is slightly greater than the inner diameter D2 of the retainer 52 so that the filter part may be snugly fitted into the retainer 52. The thickness (W) of the filter part 51' must be made small to the limit that an external pressure does not distort the filter part, so that the residue may not adhere to the inside surfaces of the meshes. In the present embodiment, the filter part 51' is more stably fixed to the retainer 52, so that the filter part is more effectively prevented from being distorted by pressures or shocks. The operation of the second embodiment is the same as the first embodiment.

As described above, the inventive filter mechanism provides means for preventing the filter part from being distorted by the pressurized air and thus from being fractured. Moreover, the residue remaining on the filter part is effectively removed by the sweeping motion of the brush. The pressures or shocks exerted to the filter part are absorbed by the buffer, thus effectively preventing the filter part from being fractured. Consequently, the inventive filter mechanism is durable, and serves to provide a regular coffee of original good taste and aroma.

What is claimed is:

1. A device for brewing the roasted and ground beans of the coffee in a vending machine comprising a ground beans receptacle (11) for containing the roasted and ground beans of the coffee, a mixing means (13) for mixing said ground beans of the coffee with a hot water, an extracting chamber (16) for providing a space used to extract a coffee liquid, an extracting means (17) for extracting said coffee liquid by jetting a pressurized air against the mixture of said roasted and ground beans and hot water, a filter mechanism (50) arranged below said extracting chamber (16) for filtering said coffee liquid, a reciprocating means (18) for lowering and raising said extracting chamber (16), and a sweeper (19) for removing the residue remaining on said filter mechanism (50), characterized in that said filter mechanism (50) further comprises a porous filter part for passing pure coffee liquid only, a support part (53) for supporting said filter part not to be distorted by an external pressure, and a buffer (54) arranged between said filter part and said support part (53) for absorbing the jetting force of said pressurized air and the tearing force of said sweeper (19).

2. A device as defined in claim 1, characterized in that said filter mechanism (50) further includes a retainer (52) for retaining said filter part, said retainer being assembled with said support part (53) so as to prevent separation of said filter part from said support part (53).

3. A device as defined in claim 2, characterized in that said filter part (51) is integrally mounted on said retainer (52).

4. A device as defined in claim 2, characterized in that said filter part (51') is snugly fitted into the inside of said retainer (52).

5. A device as defined in claim 2, characterized in that said retainer (52) and said support part (53) are assembled with their flanges thermally fused together.

6. A device as defined in claim 1, characterized in that said buffer (54) is made of a resilient material to absorb a shock exerted to said filter part (51), having a plurality of fine holes (54a) with a diameter greater than that of the pores of said filter part (51) to easily discharge the coffee liquid passing said filter part.

7. A device as defined in claim 6, characterized in that said buffer (54) is made of silicone.

8. A device as defined in claim 1, characterized in that said support part (53) includes a plurality of vertical protuberances (53d) respectively inserted into corresponding connection holes (54b) formed in said buffer (54), so that said buffer is fixedly connected to said support part (53).

9. A device as defined in claim 8, characterized in that each of said protuberances (53d) has a length greater than the thickness of said buffer (54) and a lower part thicker than the diameters of said connection holes (54b) so as to form a gap (62) between said filter part (51) and said support part (53), whereby the coffee liquid passing said filter part (51) may be easily discharged.

* * * * *